United States Patent
Masuko et al.

(10) Patent No.: US 10,091,474 B2
(45) Date of Patent: Oct. 2, 2018

(54) IMAGE PROCESSING DEVICE, IMAGE PROCESSING METHOD, PROGRAM AND COMPUTER-READABLE STORAGE MEDIUM

(71) Applicant: Rakuten, Inc., Tokyo (JP)

(72) Inventors: Soh Masuko, Tokyo (JP); Yasuyuki Hayashi, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 0 days.

(21) Appl. No.: 14/431,755

(22) PCT Filed: Apr. 18, 2013

(86) PCT No.: PCT/JP2013/061481
§ 371 (c)(1),
(2) Date: Mar. 26, 2015

(87) PCT Pub. No.: WO2014/050186
PCT Pub. Date: Apr. 3, 2014

(65) Prior Publication Data
US 2015/0244997 A1    Aug. 27, 2015

(30) Foreign Application Priority Data
Sep. 28, 2012 (JP) ................................ 2012-216568

(51) Int. Cl.
*G06K 9/00* (2006.01)
*H04N 9/31* (2006.01)
(Continued)

(52) U.S. Cl.
CPC ........... *H04N 9/3176* (2013.01); *G03B 17/54* (2013.01); *G06F 3/1415* (2013.01);
(Continued)

(58) Field of Classification Search
CPC .......... G06T 7/004; G06T 3/40; H04N 9/3176
(Continued)

(56) References Cited

U.S. PATENT DOCUMENTS

| | | | | |
|---|---|---|---|---|
| 5,850,222 A | * | 12/1998 | Cone | G06T 17/20 345/418 |
| 7,328,119 B1 | * | 2/2008 | Pryor | A63B 71/06 128/920 |

(Continued)

FOREIGN PATENT DOCUMENTS

| | | |
|---|---|---|
| CN | 102193287 A | 9/2011 |
| JP | 2002-297119 A | 10/2002 |

(Continued)

OTHER PUBLICATIONS

Bridget, "Outdoor media becomes a shoe store", [online], Jun. 3, 2012 (retrieved on Sep. 16, 2012), Internet (URL:http://www.adverblog.com/2012/06/03/outdoor-media-becomes-a-shoe-store/).

(Continued)

*Primary Examiner* — Jefferey F Harold
*Assistant Examiner* — Omer Khalid
(74) *Attorney, Agent, or Firm* — HEA Law PLLC

(57) ABSTRACT

Coordination of two actual objects can be checked even if it is difficult to match the objects each other at the same place. An image processing device acquires a projection image that includes an image of a first object projected on a projection surface, and identifies an area, in the projection image projected by projecting means, blocked by a second object in front of the projection surface. The image processing device has projection control means for controlling the projecting means so that a size of the image of the first object projected on the projection surface is life-size, and the projecting means projects the projection image in which a (Continued)

color of the area identified by the object identifying means is replaced by a predetermined color.

10 Claims, 13 Drawing Sheets

(51) Int. Cl.
 *G06T 11/00*  (2006.01)
 *G06T 11/40*  (2006.01)
 *H04N 5/74*  (2006.01)
 *G03B 17/54*  (2006.01)
 *G06F 3/14*  (2006.01)
 *G06T 11/60*  (2006.01)
 *G06Q 30/06*  (2012.01)
 *G06T 7/11*  (2017.01)

(52) U.S. Cl.
 CPC ............ *G06Q 30/0643* (2013.01); *G06T 7/11* (2017.01); *G06T 11/001* (2013.01); *G06T 11/40* (2013.01); *G06T 11/60* (2013.01); *H04N 5/7408* (2013.01); *H04N 9/3179* (2013.01); *H04N 9/3188* (2013.01); *H04N 9/3194* (2013.01); *G06T 2207/10028* (2013.01); *G06T 2207/30196* (2013.01); *G06T 2210/16* (2013.01); *G09G 2340/04* (2013.01)

(58) Field of Classification Search
 USPC ......... 382/111, 115–118, 124–127; 345/156; 463/32, 33, 34; 348/77, 78; 392/14–18, 392/51
 See application file for complete search history.

(56) References Cited

U.S. PATENT DOCUMENTS

| | | | | |
|---|---|---|---|---|
| 7,953,648 | B2 * | 5/2011 | Vock | G06Q 10/043 705/27.2 |
| 8,098,330 | B2 * | 1/2012 | Ferri | H04N 9/75 348/564 |
| 8,840,470 | B2 * | 9/2014 | Zalewski | A63F 13/00 463/30 |
| 8,976,230 | B1 * | 3/2015 | Vendrow | H04N 5/76 348/46 |
| 9,241,143 | B2 * | 1/2016 | Kreiner | H04N 9/3182 |
| 2004/0165154 | A1 * | 8/2004 | Kobori | G03B 21/26 353/69 |
| 2006/0103627 | A1 | 5/2006 | Watanabe et al. | |
| 2009/0116698 | A1 * | 5/2009 | Zhang | G06K 9/00362 382/111 |
| 2009/0190046 | A1 * | 7/2009 | Kreiner | H04N 9/3182 348/789 |
| 2010/0177968 | A1 * | 7/2010 | Fry | A61B 5/0452 382/224 |
| 2011/0096183 | A1 | 4/2011 | Robertson | |
| 2011/0116055 | A1 * | 5/2011 | Nakamura | G03B 21/14 353/82 |
| 2011/0234481 | A1 | 9/2011 | Katz et al. | |
| 2011/0273592 | A1 * | 11/2011 | Yamaoka | G06K 9/00362 348/239 |
| 2013/0185679 | A1 | 7/2013 | Fretwell et al. | |
| 2014/0010449 | A1 * | 1/2014 | Haaramo | G06T 19/00 382/173 |
| 2014/0176565 | A1 * | 6/2014 | Adeyoola | G06T 19/006 345/473 |
| 2015/0003690 | A1 * | 1/2015 | Masuko | G06T 3/40 382/111 |

FOREIGN PATENT DOCUMENTS

| | | |
|---|---|---|
| JP | 2004-254145 A | 9/2004 |
| JP | 2008-148089 A | 6/2008 |

OTHER PUBLICATIONS

English Translation of International Search Report for PCT/JP2013/061481 dated May 28, 2013.

European Search Report and the European Search Opinion dated Apr. 22, 2016 for corresponding EP application No. 13842798.4.

\* cited by examiner

FIG.7

| IMAGE NUMBER | Y-COORDINATE OF UPPER END | Y-COORDINATE OF LOWER END | CENTER POSITION OF HEAD | RATIO OF SKIN COLOR IN UPPER BODY | RATIO OF SKIN COLOR IN LOWER BODY |
|---|---|---|---|---|---|
| 1 | 50 | 1500 | (150,400) | 0.10 | 0.10 |
| 2 | 100 | 1400 | (170,350) | 0.30 | 0.10 |
| 3 | 200 | 1600 | (300,420) | 0.30 | 0.30 |
| 4 | 150 | 1450 | (175,360) | 0.10 | 0.25 |

IMAGE PROCESSING DEVICE, IMAGE PROCESSING METHOD, PROGRAM AND COMPUTER-READABLE STORAGE MEDIUM

CROSS REFERENCE TO RELATED APPLICATIONS

This application is a National Stage of International Application No. PCT/JP2013/061481 filed on Apr. 18, 2013, and which claims priority to Japanese Patent Application No. 2012-216568 filed on Sep. 28, 2012. The contents of each of the above documents are incorporated herein by reference in their entirety.

TECHNICAL FIELD

The present invention relates to an image processing device, an image processing method, a program, and a computer-readable storage medium.

BACKGROUND ART

When contemplating a purchase of clothing, people typically put items on their bodies to check their appearance, including impressions or sizes of the items of clothing (so-called coordination of clothes).

There are technologies for compositing an image of clothes or shoes with an image of a human body photographed by a camera, and outputting the composite image on a display (see non-patent literature 1). Such technologies allow a user to view the composite image on the display so as to check coordination of clothes.

CITATION LIST

Non-Patent Document

Non-patent literature 1: Bridget, "Outdoor media becomes a shoe store", [online], Jun. 3, 2012 (retrieved on Sep. 16, 2012), Internet (URL:http://www.adverblog.com/2012/06/03/outdoor-media-becomes -a-shoe-store/)

SUMMARY OF INVENTION

Technical Problem

In some cases, a user may have difficulties in combining a first object with a second object in front of the user in order to check the coordination, such as balance of sizes of the objects. More specifically, in some cases a user may have difficulties in bringing the second object to the front of the user to combine it with the first object, even though the first object is in front of the user. Examples of the first object include an item that a user considers purchasing. The above cases include giving a present of clothing. In this case, checking coordination of clothing together with a person who receives the present has been difficult. Other example is a case of looking for children's clothing, and making children stay still and wear clothes have been difficult.

One or more embodiments of the present invention have been conceived in view of the above, and an object thereof is to provide a technology for checking coordination of a first object in front of a user and a second object, even if it is difficult to combine the first object and the second object in front of the user.

Solution to Problem

In order to solve the above described problems, an image processing device according to the present invention includes projection image acquiring means for acquiring a projection image including an image of a first object that is projected on a projection surface, object identifying means for identifying an area, in an image projected by projecting means on the projection surface, blocked by a second object in front of the projection surface, and projection control means for controlling the projecting means to project the projection image in which a size of the image of the first object projected on the projection surface is life-size, and a color of the area identified by the object identifying means is replaced by a predetermined color.

An image processing method according to the present invention includes the steps of acquiring a projection image including an image of a first object that is projected on a projection surface, identifying an area, in an image projected by projecting means on the projection surface, blocked by a second object in front of the projection surface, and controlling the projecting means to project the projection image in which a size of the image of the first object projected on the projection surface is life-size, and a color of the identified area is replaced by a predetermined color.

A program according to the present invention causes a computer to function as projection image acquiring means for acquiring a projection image including an image of a first object that is projected on a projection surface, object identifying means for identifying an area, in an image projected by projecting means on the projection surface, blocked by a second object in front of the projection surface, and projection control means for controlling the projecting means to project the projection image in which a size of the image of the first object projected on the projection surface is life-size, and a color of the area identified by the object identifying means is replaced by a predetermined color.

A computer-readable storage medium according to the present invention stores the program.

According to the present invention, coordination of actual first object and second object can be checked even if it is difficult to match the objects each other in front of a user.

In an embodiment of the present invention, the object identifying means may identify the area blocked by the second object based on a depth image that indicates a distance from each pixel to imaging device.

In an embodiment of the present invention, the object identifying means may periodically identify the area blocked by the second object, and, every time the object identifying means identifies the area blocked by the second object, the projection control means may control the projecting means to project the projection image in which the color of the area identified by the object identifying means is replaced by the predetermined color.

According to the above embodiments, the user can check the coordination of the first object and the second object in real time while moving the second object.

In an embodiment of the present invention, the projection image acquiring means may acquire one of a plurality of projection images, each of which includes a human body, and the projection control means may adjust a position of the acquired projection image based on a position of the image of the first object included in the acquired projection image.

According to this embodiment, a positional relationship between the first object and the second object can be maintained even though the projection image is switched to another image.

In an embodiment of the present invention, the projection image acquiring means may acquire one of the plurality of projection images based on the area identified by the object identifying means.

According to this embodiment, when a specific area in a projection image is not desired to be seen, it is possible not to show the specific area.

In an embodiment of the present invention, the projection control means may acquire, from a user, information indicating a change of size of the projected first object, and change a size of the projection image from life-size based on the information indicating the change of size.

According to this embodiment, when a size of the first object is expected to be changed, the coordination can be checked in view of the change in size.

In an embodiment of the present invention, the projection control means may adjust the position of the projection image in a case where the projection image in life-size is changed in size based on the position of the identified area.

According to this embodiment, for example, when the size of the first object is changed, an amount of moving the second object can be reduced.

In an embodiment of the present invention, the projection control means may control the projection means to further project a predetermined image on the identified area.

In an embodiment of the present invention, in a first mode, the projection control means may control the projecting means to project the projection image in which the color of the area identified by the object identifying means is replaced by the predetermined color, and in a second mode, the projection control means may control the projecting means to project the acquired projection image on an area, in the identified area, that has been identified as not being blocked by the second object at a timing instructed by the user.

BRIEF DESCRIPTION OF DRAWINGS

FIG. 7 A diagram illustrating an example of information detected from a projection image.

DESCRIPTION OF EMBODIMENTS

An embodiment of the present invention will be described below in detail with reference to the accompanying drawings. Regarding the elements designated with the same numerals, their overlapping explanation will be omitted.

Figure 1:
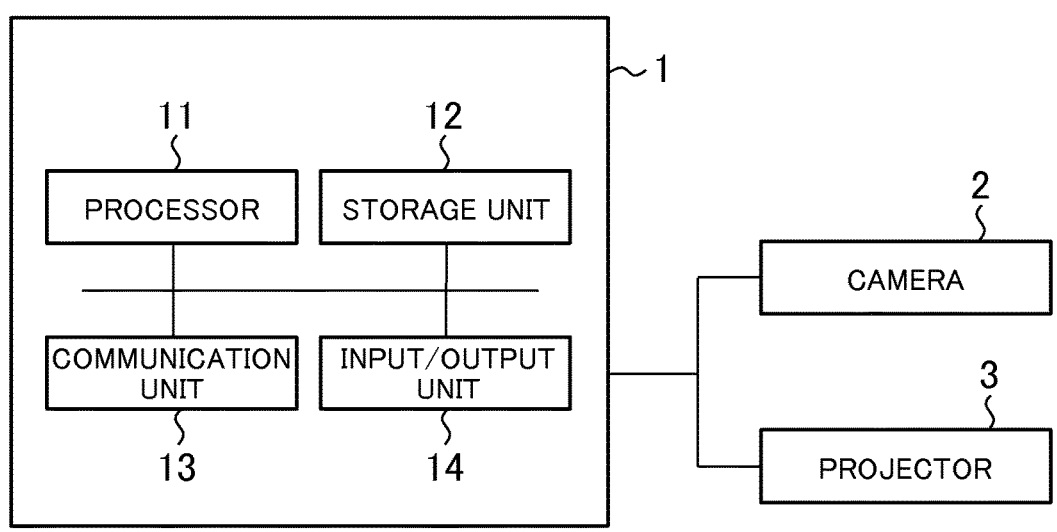
FIG. 1 A diagram illustrating an example of an image processing system according to an embodiment of the present invention.

FIG. 1 illustrates an example of an image processing system according to an embodiment of the present invention. The image processing system includes an image processing device 1, a camera 2, and a projector 3.

The image processing device 1 is a computer that a user operates, such as a personal computer and a portable terminal. The image processing device 1 includes a processor 11, a storage unit 12, a communication unit 13, and an input/output unit 14.

The processor 11 operates according to a program stored in the storage unit 12. In addition, the processor 11 controls the communication unit 13 and the input/output unit 14. The program may be provided through the Internet, for example, or stored in a computer-readable storage medium such as a DVD-ROM and provided.

The storage unit 12 includes a memory device such as a RAM or a flash memory, and a hard disk drive. The storage unit 12 stores the program. Further, the storage unit 12 stores information and computational results input from each unit.

The communication unit 13 implements functions to communicate with other devices, and includes, for example, an integrated circuit constituting a wired LAN or a wireless LAN, and an antenna. The communication unit 13 inputs information received from other devices into the processor 11 and the storage unit 12, and sends information to other devices based on the control of the processor 11.

The input/output unit 14 is a circuit for exchanging data with display output devices and other input/output devices, and includes, for example, a graphic board for outputting images on the display output device, and a USB controller obtaining data from an input device such as a keyboard, a mouse, and a camera 2. The input/output unit 14 outputs image data to the display output device and obtains information from an operator (user) using the input device and data acquired by the camera 2, based on the control of the processor 11. One of the display output devices connected to the input/output unit 14 is the projector 3, and another device is a display such as a liquid crystal display device (not shown).

The camera 2 is a device for acquiring a visible image and a depth image. The depth image consists of a plurality of pixels arranged in two dimensions, and the respective pixels have information (distance) indicating distances between the camera 2 and respective objects in the directions of the pixels. The pixels included in the depth image may respectively have three-dimensional coordinates of the objects in the directions of the pixels. The portion of the camera 2, which acquires the depth image, determines distances based on reflections of infrared rays irradiated on the objects as, for example, KINECT (registered trademark). Alternatively, a laser range finder, a camera projection system, and a stereo camera may be used for acquiring distances.

The projector 3 is a projecting device that includes a light, a lens, and an element for controlling magnitude of output light for each pixel. The projector 3 projects an image indicated by image data that is input from the input/output unit 14 on, for example, a projection surface in the direction of the lens. Here, when the projection surface is further from the projector 3, a size of the projected image is increased. In this regard, it is necessary to correct misalignment between a position of an image photographed by the camera 2 and a position of an image projected by the projector 3 in advance. In the following, calibration of such positional deviation is described as being already performed.

Figure 2:
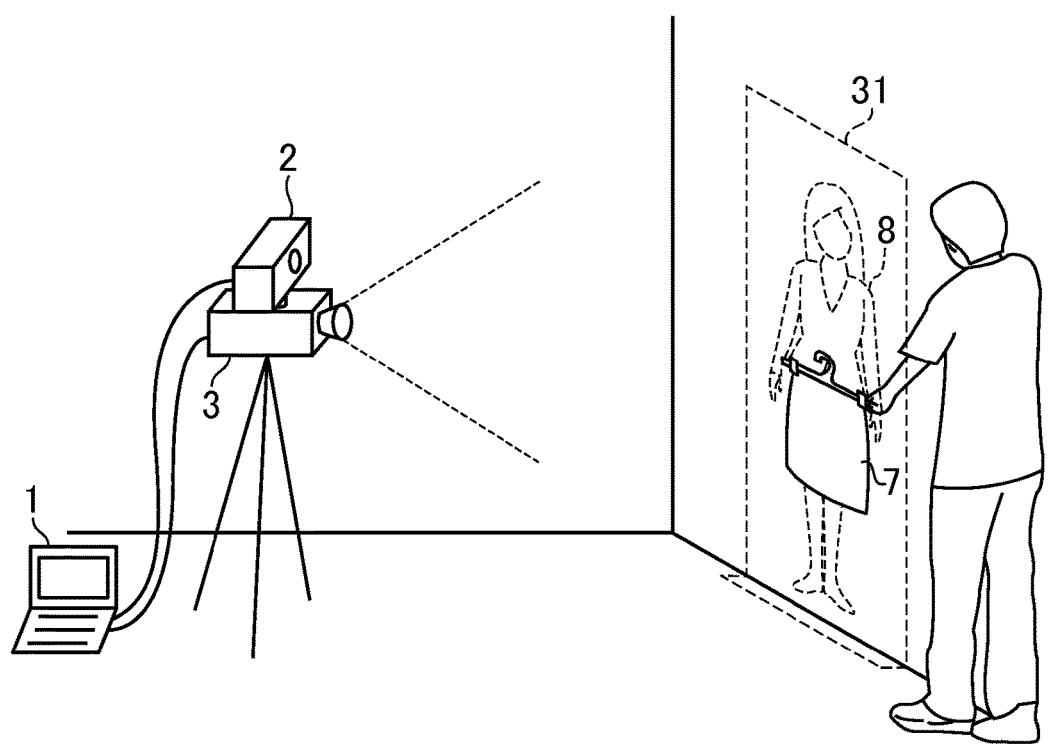
FIG. 2 A diagram illustrating an example of an arrangement of a camera, a projector, a projection surface, an object, and a projected image.

FIG. 2 illustrates an example of arrangement of the camera 2, the projector 3, the projection surface, the object, and the projected image. In FIG. 2, the projection surface is a wall, the object is a bottom wear 7, the projected image is a body image 8. When using the image processing system, the user holds an object, such as the bottom wear 7, in front of the projection surface. The camera 2 then captures the projection surface and depth and visible images of the object in the projecting direction of the projector 3. The camera 2 has a unit that irradiates infrared light used for acquiring the depth image, and the longitudinal direction of the camera 2 is orthogonal to the photographing direction. The depth and visible images photographed by the camera 2 are sent to the image processing device 1, and the projector 3 projects the body image 8 on the wall. While watching the projected image, the user adjusts the position of the bottom wear 7 and puts the bottom wear 7 on the body projected on the projection surface for easily determining coordination. The body image 8 is projected on the projection surface in the size of the original or adjusted size of the original so that the body image 8 and the bottom wear 7 are easily compared in size. In the following, an object, such as the body image 8, projected on the projection surface is also described as a first object, and an object held in front of the projection surface is also described as a second object. The second object is not limited to the bottom wear 7, but may be a top wear or a curtain, for example. In a case where the second object is a curtain, a photograph of a room including a window may be used as a projected image.

Figure 3:
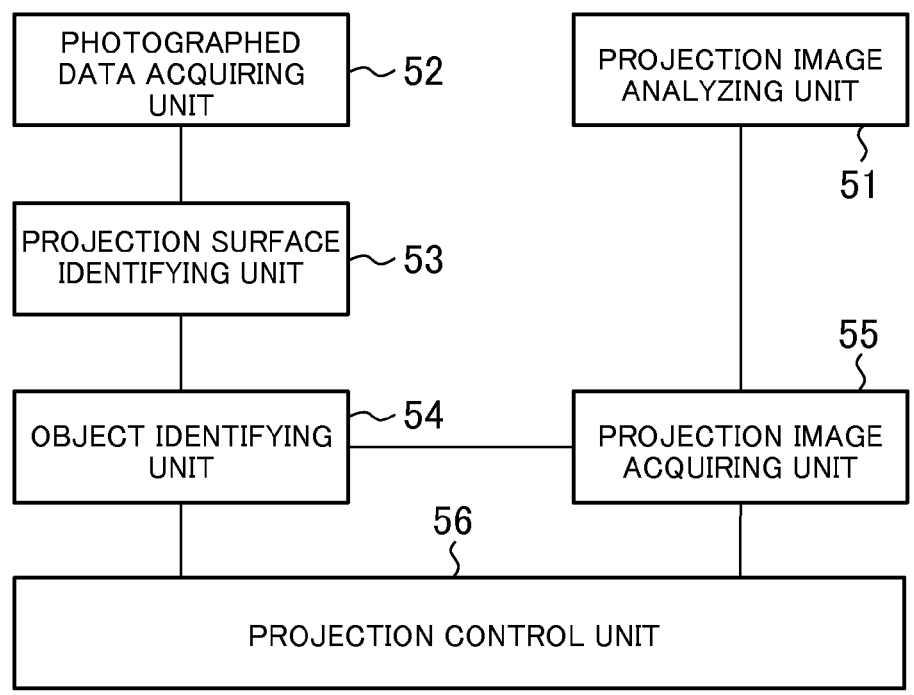
FIG. 3 A block diagram illustrating functions implemented by an image processing device.

FIG. 3 is a block diagram illustrating functions implemented by the image processing device 1. The image processing device 1 functionally includes a projection image analyzing unit 51, a photographed data acquiring unit 52, a projection surface identifying unit 53, an object identifying unit 54, a projection image acquiring unit 55, and a projection control unit 56. These functions are implemented by the processor 11 by executing a program stored in the storage unit 12 and controlling the input/output unit 14 and the like. The projection image acquiring unit 55, object identifying unit 54, and projection control unit 56 respectively correspond to projection image acquiring means, object identifying means, project control means of the claims of the present invention.

In the following, the functions implemented by the image processing device 1 will be described with use of processing flow charts and other drawings.

The projection image analyzing unit 51 is implemented mainly by the processor 11, the storage unit 12, and the communication unit 13. The projection image analyzing unit 51 obtains one or more projection images 31, which are candidates of images to be projected on the projection surface, and analyzes information for projecting an object included in the projection image 31, such as a body, in the size of the original and information for selecting one of the projection images 31. For example, when the projection images 31 include the body image 8 as an object image, the former information is a pixel length in the projection image, which corresponds to a height, and the latter information is a manner of exposed skin parts. One of the projection images 31 is processed and projected by the projector 3.

Figure 4:
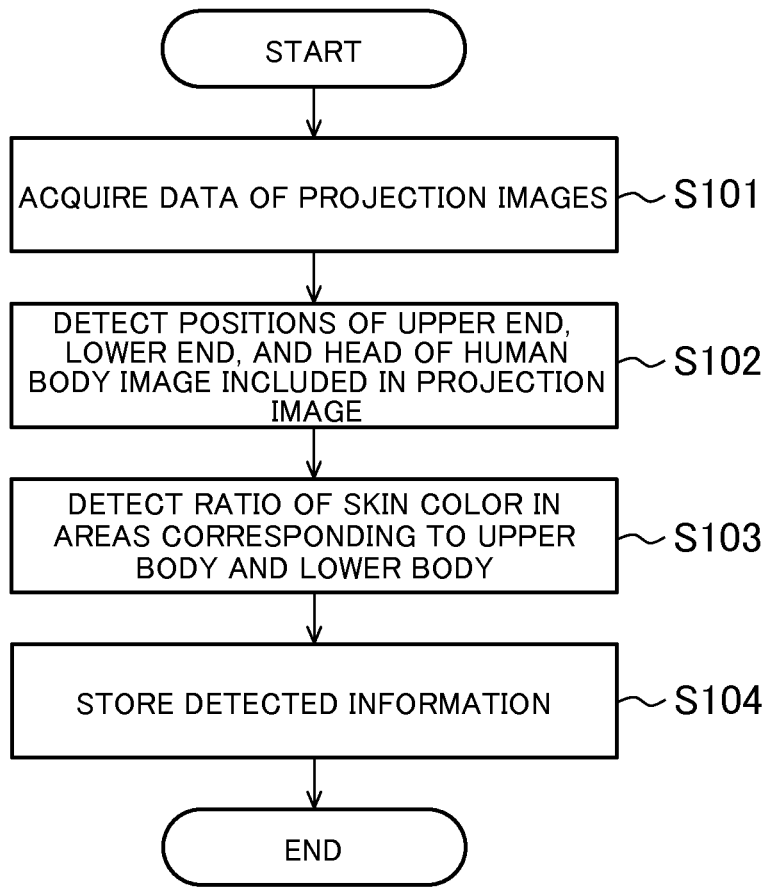
FIG. 4 A diagram illustrating an example of a flow chart of processing of a projection image analyzing unit.

FIG. 4 is a flow chart illustrating an example of processing of the projection image analyzing unit 51. The projection image analyzing unit 51 acquires image data of the projection images 31 (step S101). The projection images 31 are brought by the user and input into the image processing device 1. The projection image analyzing unit 51 may acquire image data stored in a nonvolatile memory, such as a flash memory, through the input/output unit 14 or the communication unit 13.

Subsequently, the projection image analyzing unit 51 detects positions of the upper end, lower end, and head of the image of human body included in the projection image 31 (step S102). The projection image analyzing unit 51 detects a ratio of skin color in areas corresponding to the upper body and the lower body (step S103). The projection image analyzing unit 51 stores the detected information in the storage unit 12 (step S104).

Figure 5:
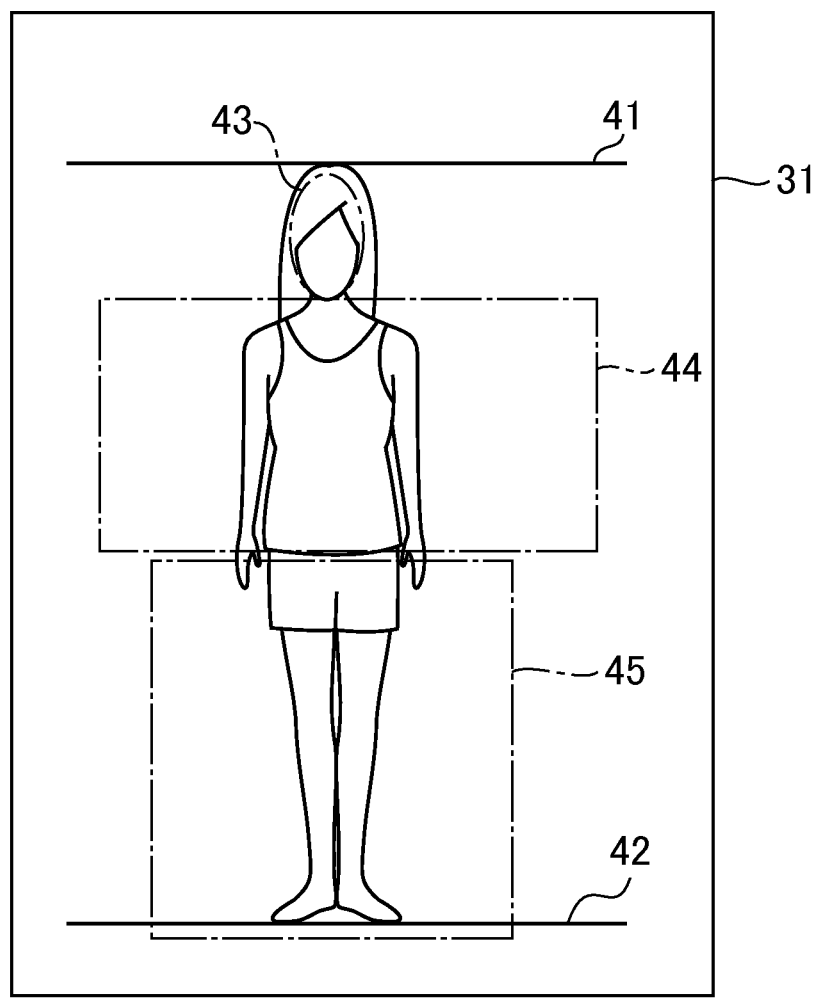
FIG. 5 A diagram illustrating an example of a projection image and a portion of analysis target.

FIG. 5 illustrates an example of the projection image 31 and an example of a portion of an analysis target. A head area 43 of the human body, the upper end of the human body, which is the upper end of the head area 43 and indicated as a human body upper end line 41, and the lower end of the human body indicated as a lower end line 42 are directly detected from the image of the human body included in the projection image 31. The head area 43 is detected according to a method of so-called facial recognition. The projection image analyzing unit 51 may detect the upper end of the human body based on the result of the facial recognition, or detect an edge corresponding to the upper end of the head of the human body to acquire the upper end. The projection image analyzing unit 51 may also acquire the lower end of the human body by detecting the edge corresponding to the shape of the human body. Alternatively, the projection image analyzing unit 51 may acquire the positions of the upper end and the lower end input by the user manually.

A skin detection area 44 corresponding to the upper body and a skin detection area 45 corresponding to the lower body shown in FIG. 5 are areas for obtaining the ratio of skin color. The position or shape of these areas may be determined based on information on the lower end positions of the head area 43 and the human body. The relationship between the lower end positions of the head area 43 and the human body, and the skin detection areas 44 and 45 may be statistically analyzed in advance and calculated based on the result of the analysis. Further, the upper end position of the human body may be used for calculating the skin detection areas 44 and 45.

Figure 6:
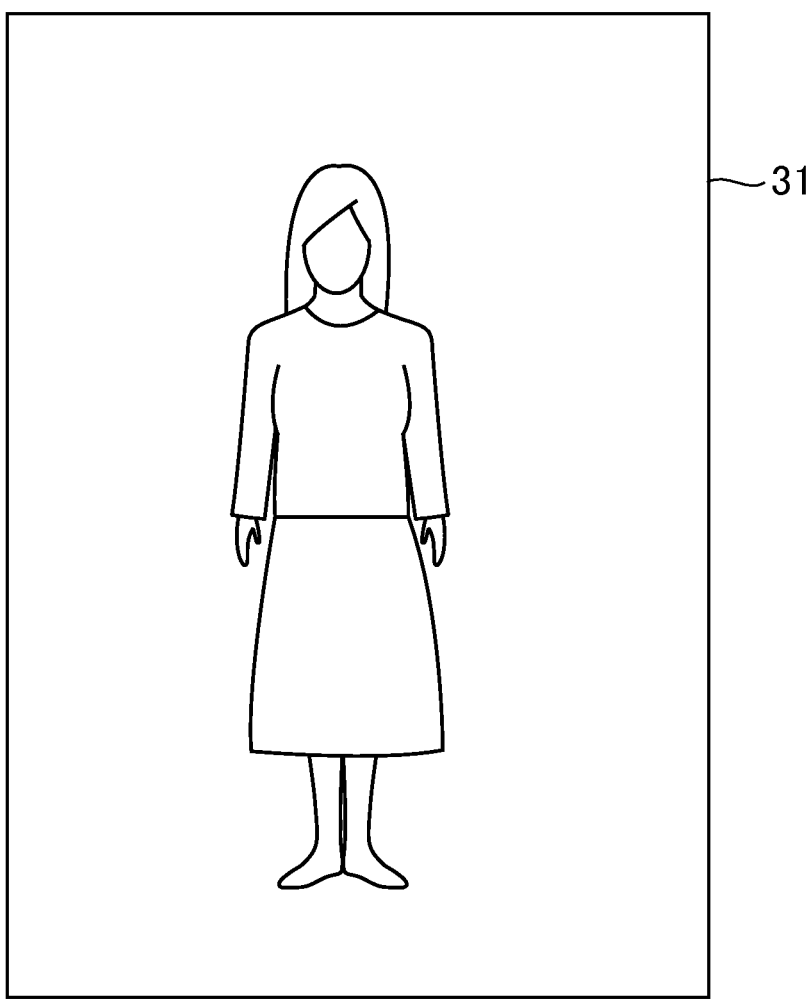
FIG. 6 A diagram illustrating an example of another projection image.

In the example of this embodiment, it is assumed that the user uses photographs, which are different in degrees of exposed skin, as the projection images 31. FIG. 6 illustrates another example of the projection image 31. The image in FIG. 6 shows smaller parts of exposed skin of the human body compared to the image in FIG. 5. Using this difference, an image to be projected on the projector is selected. Details thereof will be described later.

FIG. 7 illustrates an example of information detected from the projection images 31. FIG. 7 shows an example of data when four projection images 31 are input. This detected data includes an image number which is information for identifying the projection images 31, a y-coordinate of the upper end and the lower end of the human body in the projection image 31, a coordinate indicating the center of the head, a ratio of skin color in the upper body in the skin detection area 44, and a ratio of skin color in the lower body in the skin detection area 45, as information corresponding to the upper end and the lower end of the human body, the position of the head, degree of exposed skin of the upper body, and degree of exposed skin of the lower body. For example, the image number 1 shows lower ratio of skin color in the upper body and the lower body in the skin detection areas 44 and 45 than other projection images 31, and corresponds to the image shown in FIG. 6, for example. The image number 3 shows higher ratio of skin color in the upper body and the lower body in the skin detection areas 44 and 45 than other projection images 31, and corresponds to an image of, for example, a swim-suited person.

Figure 8:
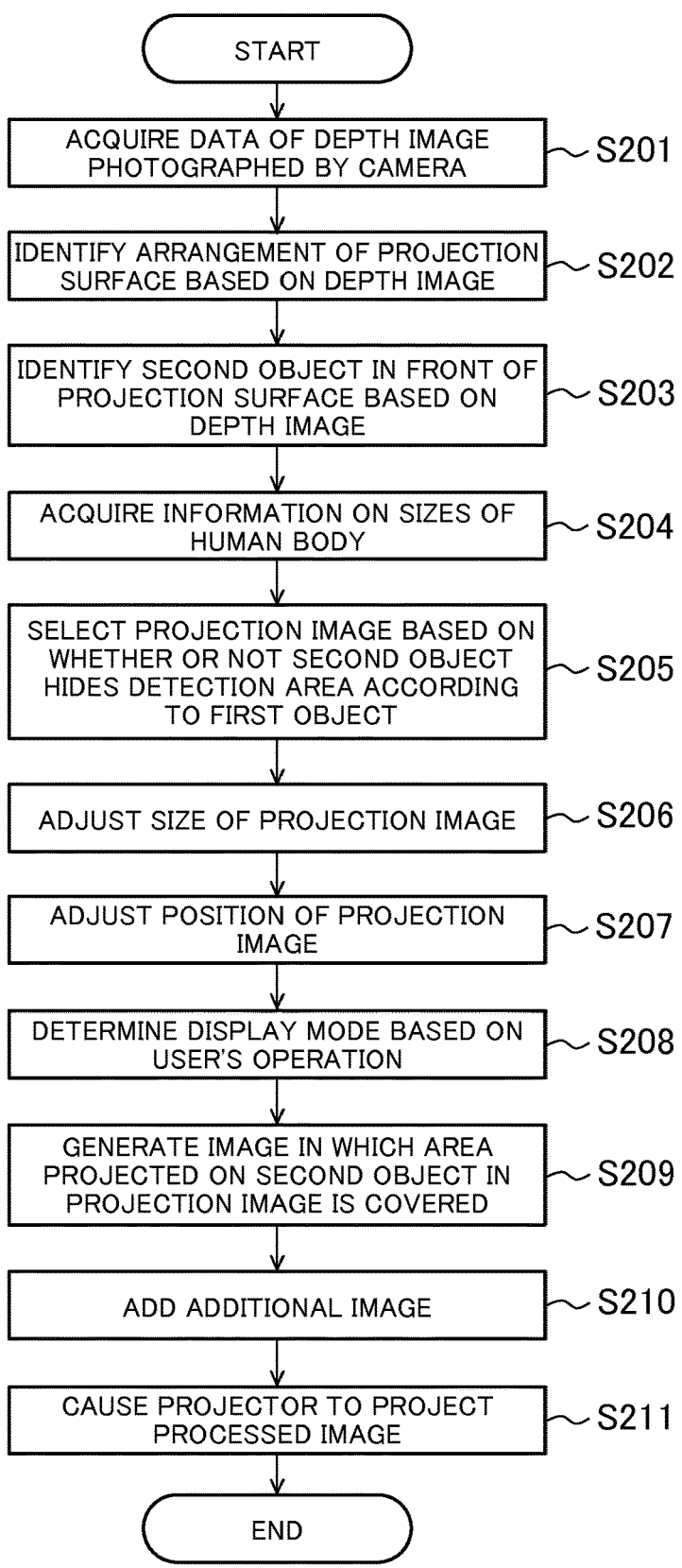
FIG. 8 A diagram illustrating an example of a flow chart of processing of a photographed data acquiring unit, a projection surface identifying unit, an object shape acquiring unit, a projection image acquiring unit, and a projection control unit.

FIG. 8 is a flow chart showing an example of processing of a photographed data acquiring unit 52, a projection surface identifying unit 53, an object identifying unit 54, a projection image acquiring unit 55, and a projection control unit 56.

The photographed data acquiring unit 52 is implemented mainly by the processor 11, the storage unit 12, and the input/output unit 14. The photographed data acquiring unit 52 acquires data of a depth image and a visible image of the projection surface and an object held in front of the projection surface which are photographed by the camera 2 (step S201).

The projection surface identifying unit 53 is implemented mainly by the processor 11 and the storage unit 12. The projection surface identifying unit 53 identifies arrangement of the projection surface based on the depth image acquired by the photographed data acquiring unit 52 (step S202). Methods for detecting the projection surface may include extracting three or more points at the corners of the depth image, and identifying the position and the tilt of the projection surface based on the three-dimensional positions of the points. Alternatively, The projection surface identifying unit 53 detects a line of an edge, which has a depth that changes abruptly, from the depth image in advance, and eliminates the area surrounded by the line so as to extract the points for identifying the position and the tilt of the projection surface. The processing of the projection surface identifying unit 53 may be omitted. Instead of the processing, for example, the user may manually measure a distance to the projection surface in advance, and cause the storage unit 12 to store the distance.

The object identifying unit 54 is implemented mainly by the processor 11 and the storage unit 12. The object identifying unit 54 identifies an object (second object) in front of the projection surface based on the depth image (step S203). More precisely, the object identifying unit 54 identifies an area 33, which is blocked by the second object, in the image that the projector 3 projects on the projection surface. Specifically, for example, the object identifying unit 54 detects a line of an edge where the distance from the camera 2 is changed abruptly in the depth image, and identifies an area surrounded by the line of the edge as the area 33 blocked by the second object. Alternatively, the object identifying unit 54 may identify, in the depth image, an area that is in front of the projection surface identified by the projection surface identifying unit 53 and away from the projection surface by a predetermined distance or more, as the area 33 blocked by the second object. When detecting the area 33 blocked by the second object, the object identifying unit 54 may correct misalignment of the area due to the difference between spatial positions of the camera 2 and the projector 3 with use of correction information stored in advance. The correction information is, for example, information of misalignment in the XY direction between the image projected by the projector 3 and the image photographed by the camera 2. The object identifying unit 54 calculates the area 33 blocked by the second object based on the relationship between the spatial positions of the second object toward the camera 2 and the projector 3 toward the camera 2. The correction information indicating the spatial position of the second object toward the camera 2 can be calculated based on the image photographed by the camera 2. Needless to say, the object identifying unit 54 can identify the area 33 blocked by the second object before or after the projector 3 projects the projection image 31. The area 33 blocked by the second object may be an area, in the projection image 31, that is blocked by the second object when the projection image 31 is projected.

Figure 9A:
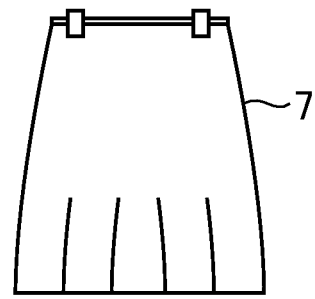
FIG. 9A A diagram illustrating an example of a shape of an object in front of the projection surface.
Figure 9B:
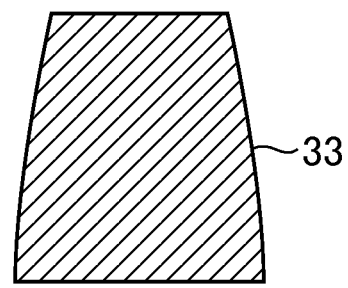
FIG. 9B A diagram illustrating an example of an area indicating an object in front of the projection surface identified by a depth image.

FIG. 9A illustrates an example of a shape of an object in front of the projection surface. FIG. 9B is a diagram of an example of the area 33 indicating an object in front of the projection surface identified by the depth image. The depth image of the bottom wear 7 as shown in FIG. 9A shows that a distance from the camera 2 to a portion outside the edge of the bottom wear 7 is sharply increased compared to a distance from the camera 2 to a portion inside the edge of the bottom wear 7, and the difference of the distances is more than a predetermined value. If the projection surface is plane and its direction has been detected, a distance between the projection surface and each pixel constituting the depth image can be calculated, and an area including pixels that are away from the projection surface by a threshold value may be separated as an area 33 of the second object. If the projection surface is perpendicular to the direction of the camera 2, the object identifying unit 54 may separate the bottom wear 7 from the projection surface in the rear of the bottom wear 7 by regarding an area consisting of pixels of images of the depth image, where each of the pixels is away from the camera 2 in a distance shorter than the threshold value, as the area 33 of the second object.

The object identifying unit 54 may identify the area 33 blocked by the second object using the visible image. For example, the object identifying unit 54 may periodically generate a state in which the projection image 31 is not projected, and detect an edge of the second object in the visible image acquired in that state, thereby identifying the area 33 blocked by the second object.

Figure 10:
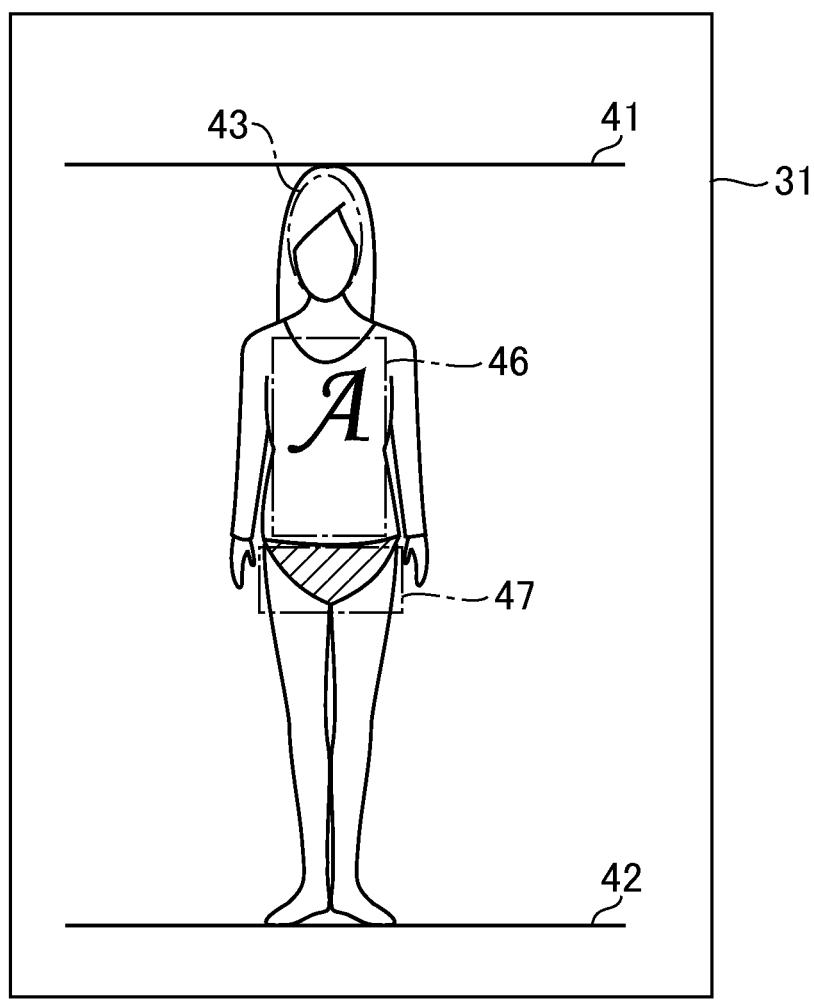
FIG. 10 A diagram illustrating an example of a relationship between an image of a human body and a detection area.

The projection image acquiring unit 55 is implemented mainly by the processor 11 and the storage unit 12. The projection image acquiring unit 55 selects one of the projection images 31 that are input by the user and analyzed by the projection image analyzing unit 51. Specifically, the projection image analyzing unit 51 acquires information on sizes of the human body (step S204), and selects one of the projection images 31 based on whether or not the second object hides a detection area that is determined according to the first object included in the projection image 31 (step S205). FIG. 10 illustrates an example of relationship between the image of the human body and the detection areas 46 and 47. The detection area 46 is an area corresponding to the upper human body excluding arms and hands, and the detection area 47 is an area corresponding to the lower human body around hips.

When the second object does not hide (cover) the detection area 46 corresponding to the upper body, the projection image acquiring unit 55 selects an image having a smaller degree of exposed skin (ratio of skin color) in the skin detection area 44 corresponding to the upper body than a threshold value, as a candidate of the projection image 31. In this way, it is possible to prevent carelessly projecting an image having high degree of exposed skin of the upper body. On the other hand, when the second object hides (covers) the detection area 46 corresponding to the upper body, the projection image acquiring unit 55 selects an image having a higher degree of exposed skin (ratio of skin color) in the skin detection area 44 corresponding to the upper body than a threshold value, as a candidate of the projection image 31. In this way, it is possible to prevent the top wear in the projection image 31 held in front of the upper body from being protruded from the second object (top wear).

Further, when the second object does not hide the detection area 47 corresponding to the lower body, the projection image acquiring unit 55 acquires, among from the candidates, an image having a smaller degree of exposed skin in the skin detection area 45 corresponding to the lower body than the threshold value as the projection image 31. In this way, it is possible to prevent carelessly projecting an image having high degree of exposed skin in the lower body. On the other hand, when the second object hides the detection area 47 corresponding to the lower body, the projection image acquiring unit 55 acquires an image having higher degree of exposed skin in the skin detection area 45 corresponding to the lower body than the threshold value as the projection image 31. In this way, it is possible to prevent the bottom wear in the projection image 31 held in front of the lower body from being protruded from the second object (bottom wear).

As a result, when the body image 8 is projected, rough positioning of the bottom wear 7 etc. can be performed using the image having lower degree of exposed skin, and coordination can be checked using the image having higher degree of exposed skin, from which the top wear and the bottom wear are not easily protruded.

The projection image 31 can be selected without using the ratio of skin color. The user may specify whether the exposure of the upper body and the lower body is high or not for each image in advance, and select an image based on such information.

The information on sizes acquired in step S204 includes, for example, a height input by the user. In addition, information on ages of children may also be acquired as information on size. For example, the projection image acquiring unit 55 may estimate a height of a child in six months based on the child's age, height, and known growth curve, and use the estimated height in the processing described below. In this way, when looking for clothing of a child, a user can easily check the coordination while considering growth of the child's height. The projection image acquiring unit 55 calculates positions and sizes of the detection areas 46 and 47 based on such size information, the position of the head area 43 and the position of the lower end human body, which are acquired from any of the projection images 31, and the projection surface. The projection image acquiring unit 55 may statistically analyze a relationship among the position of the head area 43, the position of the lower end human body and the positions of the detection areas 46 and 47 in advance, and calculate the positions and the sizes of the detection areas 46 and 47 based on the result of the analysis and the position of the projection surface.

The projection image 31 may be selected manually. For example, a plurality of projection images 31 may be displayed and the user may select one of the projection images 31 to be projected by the projector 3.

The projection control unit 56 implemented mainly by the processor 11, the storage unit 12, and the input/output unit 14. The projection control unit 56 controls the projector 3 to project the projection image 31. In particular, the projection control unit 56 controls the projector 3 so that, in the projection image 31, a size of an image of the first object projected on the projection surface is life-size and the area projected on the second object is covered.

First, the projection control unit 56 adjusts a size of the projection image 31 (step S206). More specifically, the projection control unit 56 uses the information, which relates to the size of the second object and is acquired in the step S204, to enlarge and reduce the size of the projection image 31 so that the first object, such as the body image 8, included in the projection image 31 is displayed in or close to life-size on the projection surface. When adjusting the size, the projection control unit 56 may change the actual size of the first object to be projected in view of the child's age, for example, as described above. The rate of scaling is calculated using information on the size according to which the first object is projected, the size on the projection screen, and the projection surface (e.g., distance to projection surface). For example, if the projection surface is perpendicular to the projecting direction of the projector 3, it is determined how many pixels of the projector 3 correspond to a length of a line equivalent to the height of the human body in the distance of the projection surface. Then, a rate between the determined number of pixels and the number of pixels of the human body upper end line 41 and the lower end line 42 of the human body may be set as the rate of scaling.

Subsequently, the projection control unit 56 adjusts the position of the projection image 31 (step S207). This processing is performed for projecting the projection image 31 at the same position even though the positions of the first object, such as a human body, are different depending on the projection images 31. More specifically, the position of the projection image 31 is adjusted such that the position of the head projected on the projection surface overlaps any of the projection images 31 selected. In this regard, the projection control unit 56 may adjust the size and the position by converting image data of the projection image 31 with use of software or using hardware such as an image processing circuit mounted on a graphic board.

The projection control unit 56 determines a display mode based on the user's operation (step S208). More specifically, the projection control unit 56 switches from a normal first mode to a second mode for checking an amount of correction of clothing, for example, when the user performs a predetermined action, such as fixing the position of the first object for a predetermined period of time or waving the first object slightly. The operations of the first mode and the second mode are discussed below.

Subsequently, the projection control unit 56 generates an image in which an area 33 projected on the second object in the projection image 31 is covered (step S209). This processing varies depending on the display modes. In the first mode, the projection control unit 56 generates an image in which an area 33 projected on the second object is covered, by replacing the color of the area 33 that corresponds to the second object, such as FIG. 9B, identified by the object identifying unit 54, with a predetermined color. In the second mode, the projection control unit 56 generates an image in which a projection image 31 is projected on an area that is a part of the area 33 on the second object and where the second object is not identified at a timing instructed by the user, and in which a part of the projection image 31 is not projected on other areas of the second object. More specifically, the processing for hiding the area is executed by, for example, painting over the area in white. Any color may be used for painting over the area unless it causes a problem of the color of the second object on which the color of the area is projected, however it may be preferable to use white or gray.

Subsequently, the projection control unit 56 adds an additional image (step S210). The additional image is an image, such as a scale, that enables measuring a length of the bottom wear 7. More specifically, the projection control unit 56 adds, to the image processed in step S209, an image of a scale extending from the upper end to the lower end of the area 33 of the identified second object. The position of zero of the scale is, for example, the upper end (in a case of bottom wear 7) or the lower end of the area. This processing is executed in the first mode, and may not be executed or omitted in the second mode.

Figure 11:
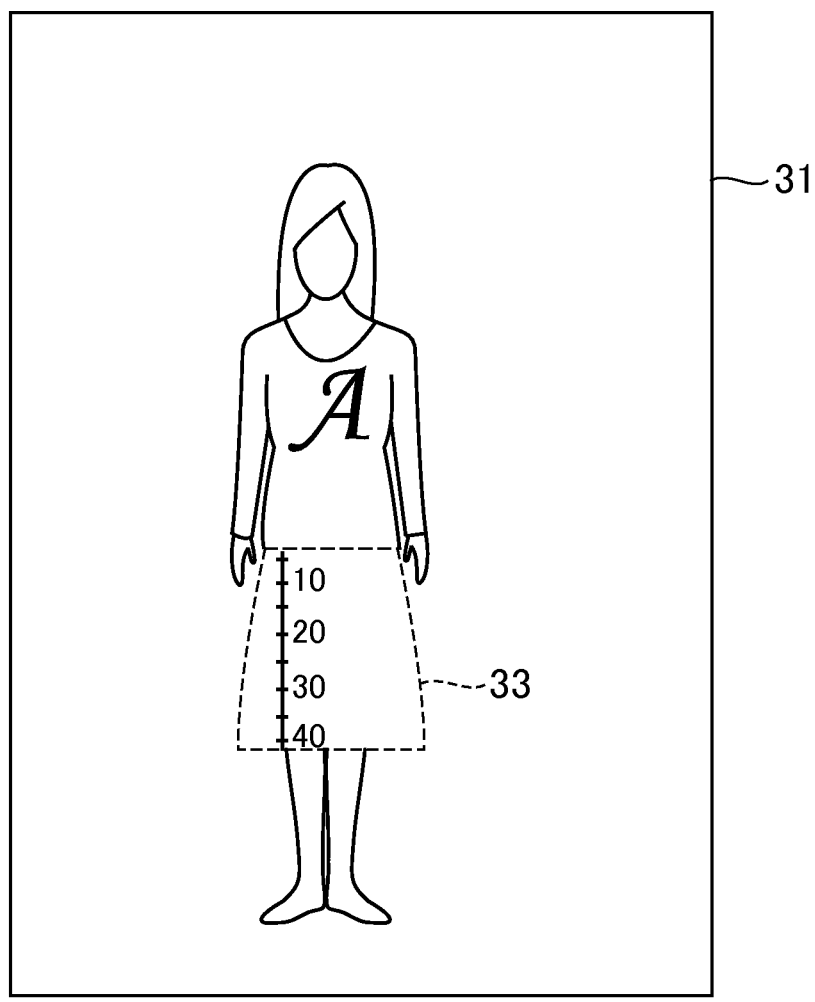
FIG. 11 A diagram illustrating an example of a processed image.

FIG. 11 illustrates an example of an image that is projected on the projector 3 and processed in the first mode. A portion surrounded by the dashed line in FIG. 11 is a portion covered in the processing in step S209, and an image of a scale in the vertical direction is added as an additional image. The image of the scale is adjusted such that, when the scale is added to the bottom wear 7, the upper end portion of the bottom wear 7 is set as zero.

Figure 12:
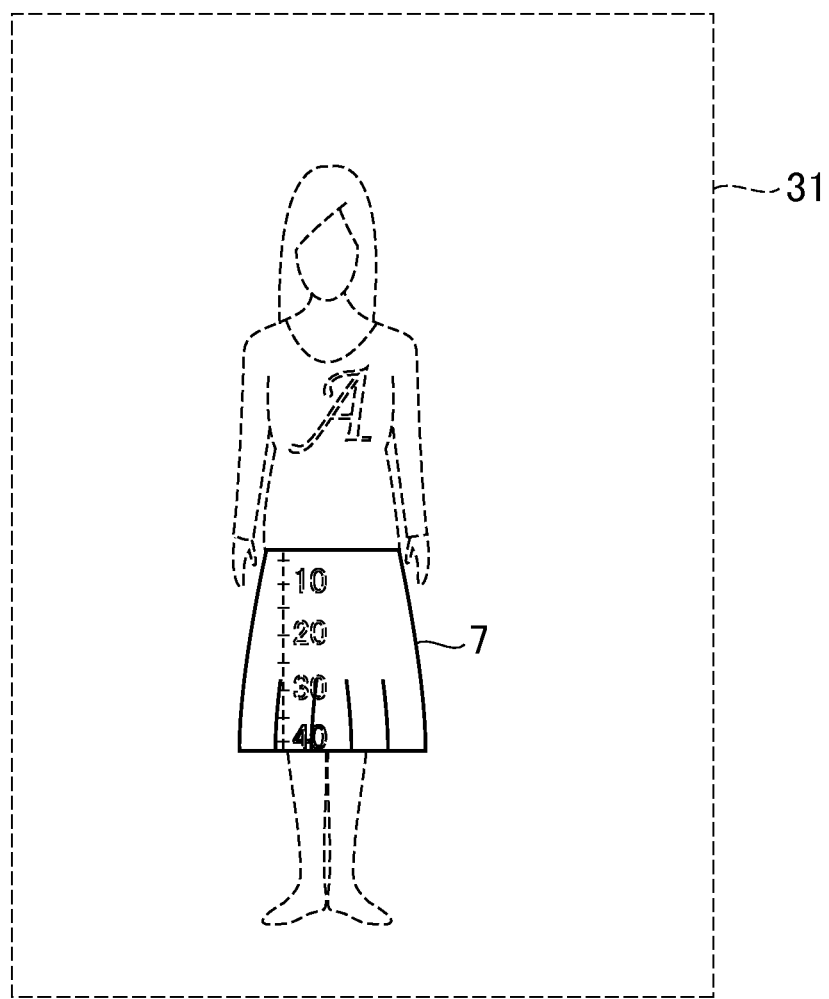
FIG. 12 A diagram illustrating an example of a projected image and a second object in a first display mode.

Subsequently, the projection control unit 56 causes the projector 3 to project the processed image (step S211). FIG. 12 illustrates an example of the projected image and the second object in the first display mode. The processing by the image processing device 1 allows the user to feel a situation that the second object, which is the original, is held in front of the human body displayed on the projection image 31. In this way, it is possible to check an impression or a size when the original is combined with a person or an item that is difficult to be brought to a place where the original, such as a product, is placed. In addition, texture of an item, which is most important when looking for items, can be recognized. An image such as a scale is projected on the second object, and thus the user can easily find out amount of correction when it is tailor-made or a length needs to be adjusted.

Figure 13:
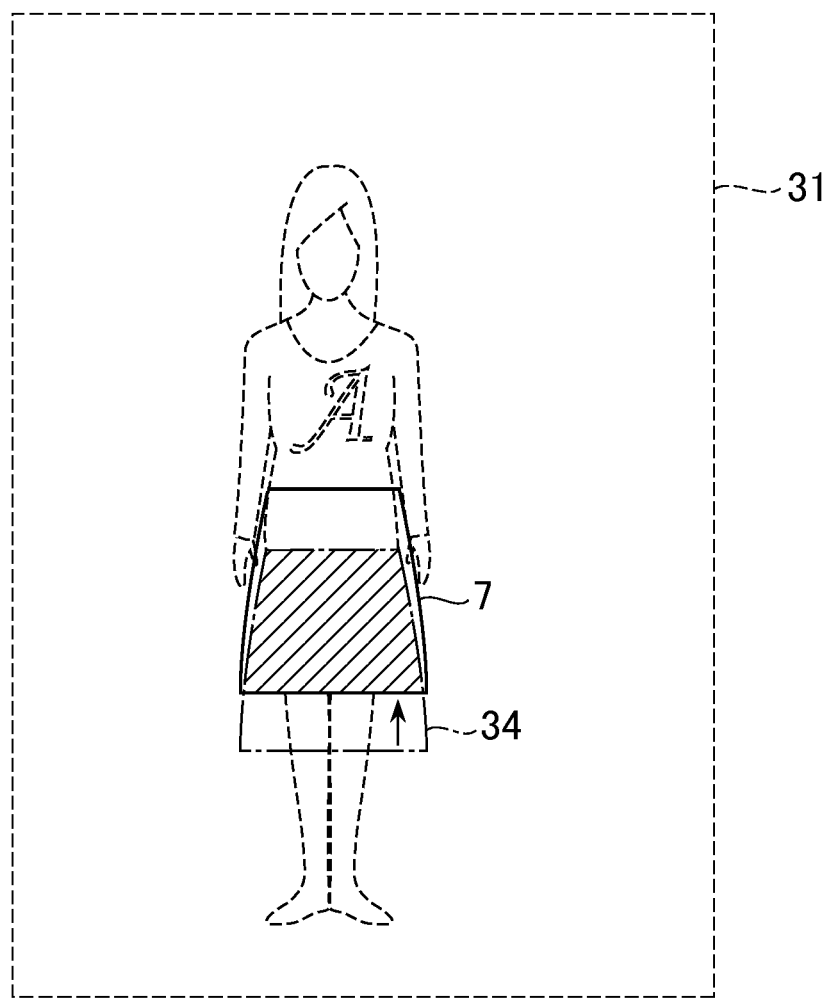
FIG. 13 A diagram illustrating an example of a projected image and a second object in the second display mode.

FIG. 13 illustrates an example of the projected image and the second object in the second display mode. When looking for clothing and checking an amount of correction to the length of the bottom wear 7, such as a skirt, it is considered that the lower end of the bottom wear 7 is positioned properly and that an amount of movement of the upper end is measured as the amount of correction. In this way, the amount of correction can be easily recognized compared to checking it by rolling up the hem of the bottom wear 7. For example, the user moves the position of the bottom wear 7 up and down and projects the human body at a portion that has moved upward from the original position, thereby further easily recognizing the amount of correction. FIG. 13 does not show a scale, although the projection control unit 56 may display a scale as shown in FIG. 11. In this case, the projection control unit 56 may control the scale to extend from the upper end of an initial position area 34, which is covered by the bottom wear 7 at a timing the user instructs, to the lower end of the bottom wear 7 (area 33 corresponding to bottom wear 7) that has been moved (present time). Further, the projection control unit 56 may display the scale starting from the lower end of the bottom wear 7 at the timing instructed by the user or the upper end of the moved bottom wear 7 so that the amount of movement can be recognized.

The invention claimed is:

1. An image processing device comprising:
at least one processor; and
at least one memory device that stores a plurality of instructions, which when executed by the at least one processor, causes the at least one processor to:

obtain a ratio of skin color in a skin detection area of a plurality of projection images each of which includes an image of a human body to be projected on a projection surface;
select one of the plurality of projection images;
identify an area, in an image projected by a projector on the projection surface, blocked by real clothes which is not included in the projection image and in front of the projection surface; and
control, based on information on an original size of the human body, the projector to project the selected projection image in which a size of the image of the human body projected on the projection surface is the same size as the human body regardless of the distance of the projector to the projection surface, and a color of the identified area blocked by the real clothes is replaced by a predetermined color image,
wherein, in the selection, the processor selects one of the plurality of projection images based on the obtained ratio of skin color and whether the real clothes blocks a detection area that is determined according to the human body included in each of the plurality of projection images.

2. The image processing device according to claim 1,
wherein the processor further identifies the area blocked by the real clothes based on a depth image that indicates a distance from each pixel to an imaging device.

3. The image processing device according to claim 1,
wherein the processor further periodically identifies the area blocked by the real clothes, and
wherein, every time the area blocked by the real clothes is identified, the processor further causes the projector to project the selected projection image in in which the color of the identified area is replaced by a predetermined color image.

4. The image processing device according to claim 1,
wherein the processor further adjusts a position of the acquired one of the plurality of projection images based on a position of the image of the human body included in the selected one of the plurality of projection images.

5. The image processing device according to claim 1,
wherein the processor further acquires, from a user, information indicating a change of size of the projected human body, and controls the projector to change a size of the projection image from life-size based on the information indicating the change of size.

6. The image processing device according to claim 5,
wherein the processor further adjusts the position of the projection image in a case where the projection image in life-size is changed in size based on the position of the identified area.

7. The image processing device according to claim 1,
wherein the processor further controls the projector to further project a predetermined image on the identified area.

8. The image processing device according to claim 1,
wherein, in a first mode, the processor further controls the projector to project the selected projection image in which the color of the identified area is replaced by a predetermined color image, and
wherein, in a second mode, the processor further controls the projector to project the selected projection image on an area, in the identified area, that has been identified as not being blocked by the real clothes at a timing instructed by a user.

9. An image processing method comprising the steps of:
obtain a ratio of skin color in a skin detection area of a plurality of projection images each of which includes an image of a human body to be projected on a projection surface;
select one of the plurality of projection images;
identifying an area, in an image projected by a projector on the projection surface, blocked by real clothes which is not included in the projection image and in front of the projection surface; and
controlling, based on information on an original size of the human body, the projector to project the projection image in which a size of the image of the human body projected on the projection surface is the same size as the human body regardless of the distance of the projector to the projection surface, and a color of the identified area blocked by the real clothes is replaced by a predetermined color image,
wherein, in the selection, one of the plurality of projection images is selected based on the obtained ratio of skin color and whether the real clothes blocks a detection area that is determined according to the human body included in each of the plurality of projection images.

10. A computer-readable non-transitory storage medium for storing a program that causes a computer to execute processing of:
obtain a ratio of skin color in a skin detection area of a plurality of projection images each of which includes an image of a human body to be projected on a projection surface;
select one of the plurality of projection images;
identifying an area, in an image projected by a projector on the projection surface, blocked by real clothes which is not included in the projection image and in front of the projection surface; and
controlling, based on information on an original size of the human body, the projector to project the projection image in which a size of the image of the human body projected on the projection surface is the same size as the human body regardless of the distance of the projector to the projection surface, and a color of the identified area blocked by the real clothes is replaced by a predetermined color image,
wherein, in the selection, one of the plurality of projection images is selected based on the obtained ratio of skin color and whether the real clothes blocks a detection area that is determined according to the human body included in each of the plurality of projection images.

* * * * *